UNITED STATES PATENT OFFICE.

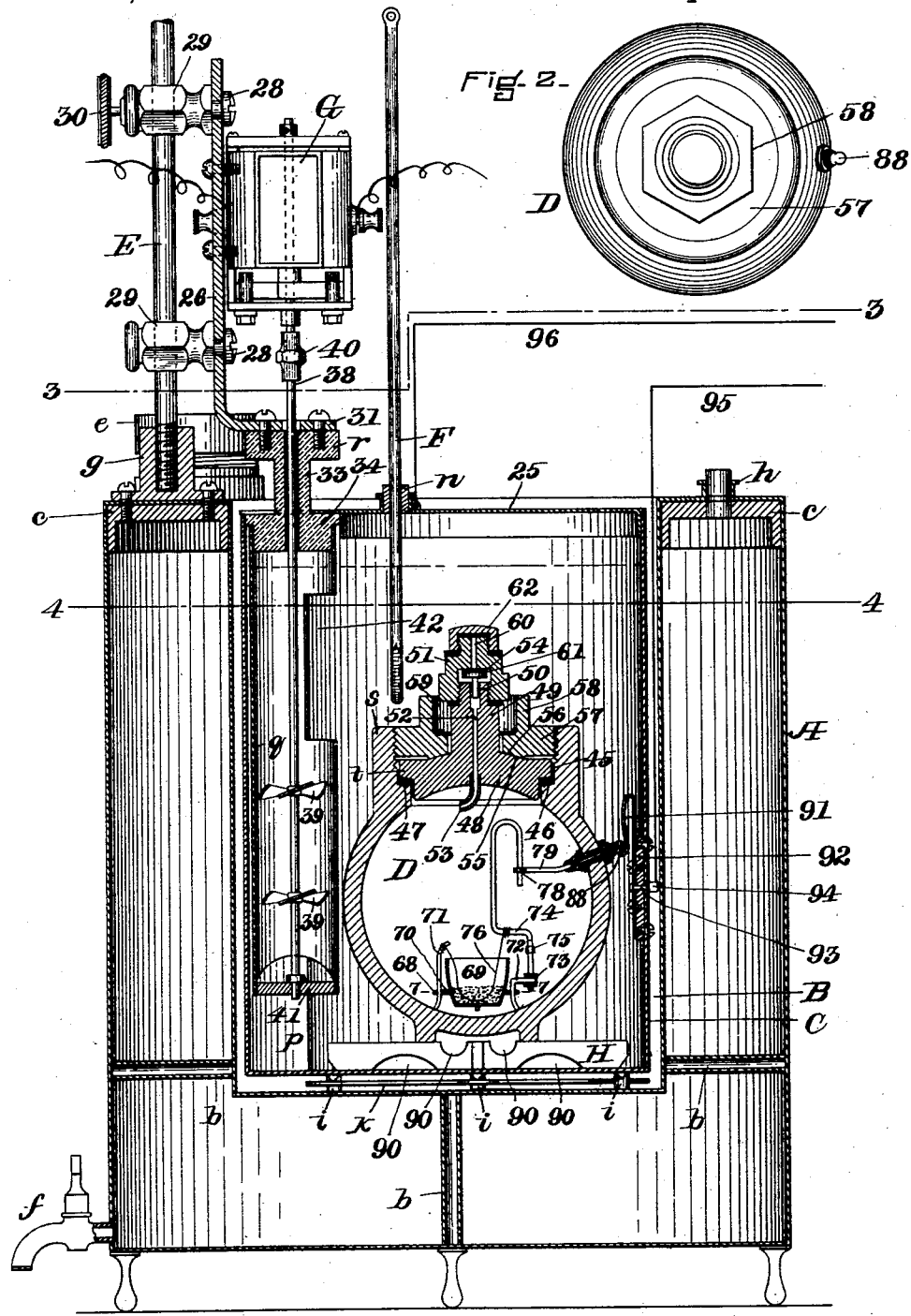

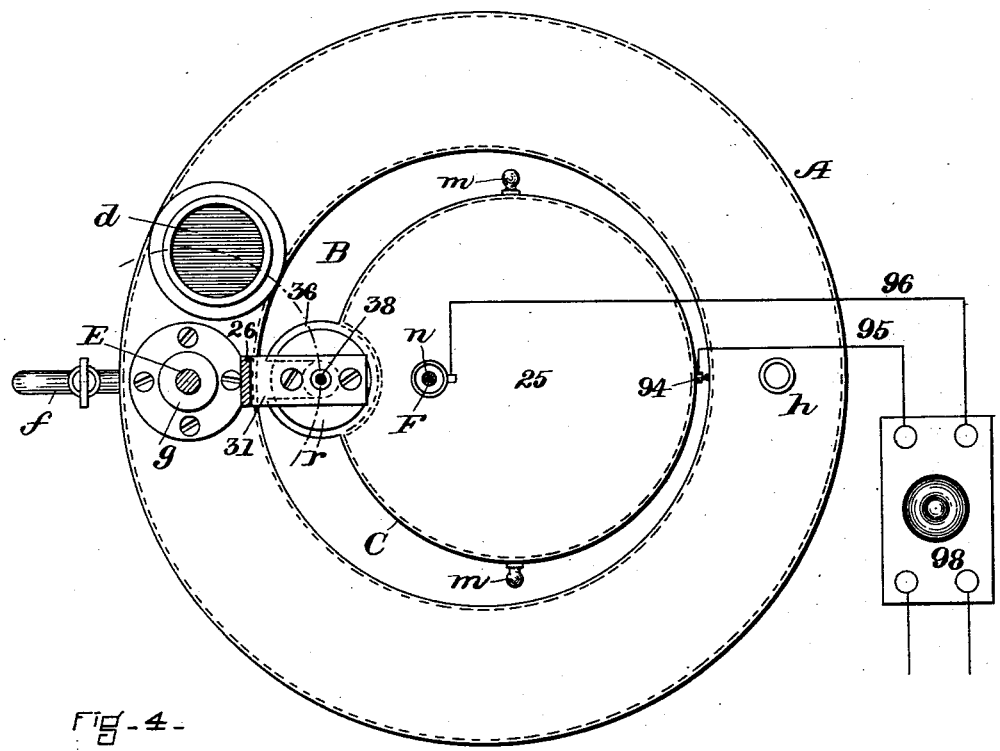
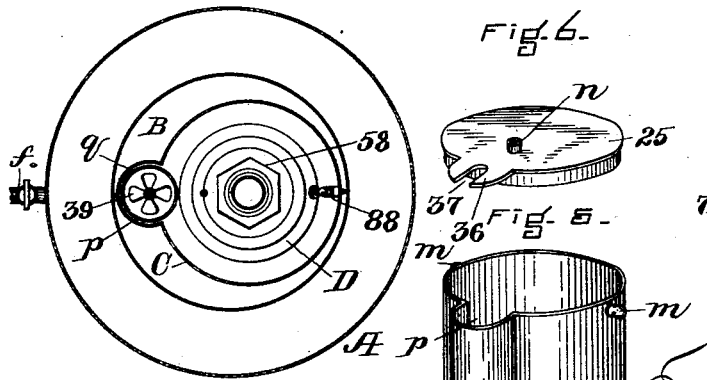
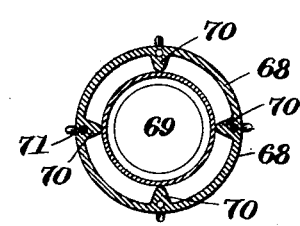

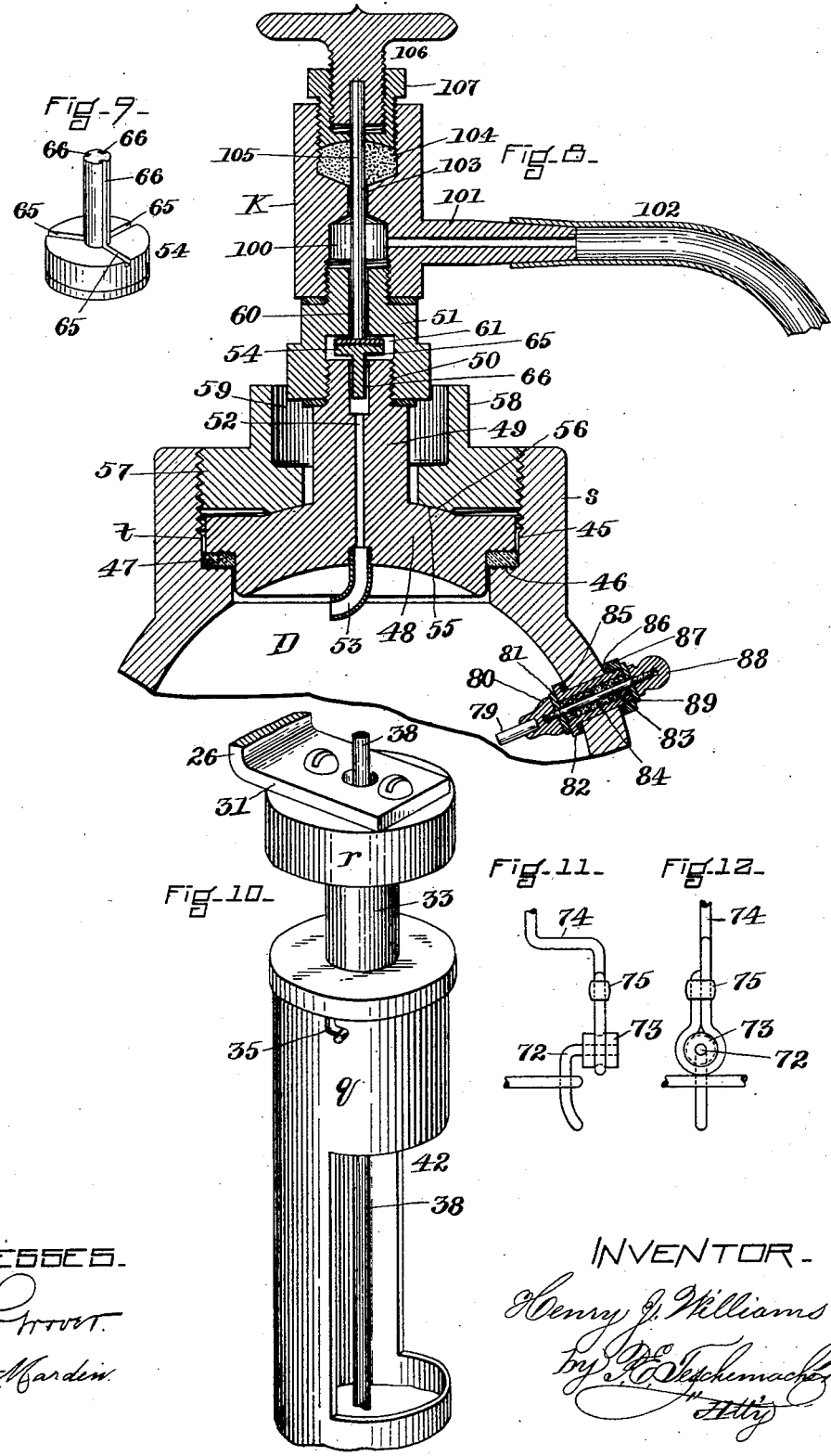

HENRY J. WILLIAMS, OF BOSTON, MASSACHUSETTS.

CALORIMETER.

SPECIFICATION forming part of Letters Patent No. 590,408, dated September 21, 1897.

Application filed December 5, 1896. Serial No. 614,624. (No model.)

*To all whom it may concern:*

Be it known that I, HENRY J. WILLIAMS, a citizen of the United States, residing at Boston, in the county of Suffolk and State of Massachusetts, have invented certain new and useful Improvements in Calorimeters, of which the following is a full, clear, and exact description, reference being had to the accompanying drawings, making part of this specification, in which—

Figure 1 is a central vertical section of a calorimeter embodying my invention, all of the parts being in a proper position for testing the calorific power of a combustible. Fig. 2 is a plan of the "bomb" or combustion-chamber. Fig. 3 is a horizontal section on the line 3 3 of Fig. 1. Fig. 4 is a horizontal section on the line 4 4 of Fig. 1, drawn on a reduced scale. Fig. 5 is a perspective view of the calorimeter-can on a reduced scale. Fig. 6 is a perspective view of the cover of the same. Fig. 7 is an enlarged sectional detail on the line 7 7 of Fig. 1. Fig. 8 is a vertical section of the upper portion of the bomb, showing the appliance for discharging the gas from the same after the test. Fig. 9 is an enlarged inverted perspective view of the check-valve. Fig. 10 is an enlarged perspective view of the upper portion of the stirring device and its tubular casing. Figs. 11 and 12 are details of the crucible-stand to be referred to.

My invention relates to improvements in a class of physical apparatus known as "calorimeters" and especially that class of calorimeters called "bomb-calorimeters" employed for measuring with scientific precision the true calorific power of combustible substances of any and every description. By way of example the apparatus may be employed for determining the calorific power of coal, wood, oils, gases, and other fuels, together with that of any and every combustible substance whether of organic or inorganic nature. All calorimeters of this class hitherto constructed have failed to satisfactorily meet scientific requirements owing to certain inherent, but apparently unsuspected, sources of error in the apparatus itself. These errors are caused partly by the lack of durability of certain exposed parts, partly also by defects of form and faulty or inadequate construction. It has been found difficult to provide a charging-valve for the introduction of oxygen gas into the bomb or combustion-chamber short enough to admit of being completely submerged during the combustion and simple enough to avoid frequent getting out of order and leakage. A more serious difficulty has been to construct a closing device for the bomb which without being too heavy can with little effort be repeatedly closed with perfect tightness and as readily opened. These sources of error which exist in the present forms of calorimeters vitiate the results which they yield, while their construction is such that the handling of the apparatus is unduly laborious for a single operator.

My purpose in constructing a new calorimeter has been to avoid as far as possible every source of error existing in the calorimeters now in use, to simplify and improve many of the parts, and to make several of the operations automatic, so that the apparatus can readily be handled by a single operator. My chief aims have been to greatly increase the sensitiveness and accuracy of the instrument, so as to meet the most rigid scientific requirements, to make it possible to measure with well-nigh absolute exactitude the true calorific power of combustibles, and to secure a much greater degree of accuracy in these measurements than has hitherto been found possible.

To this end my invention consists in certain structural features and combinations of parts, as will be hereinafter fully described, and pointed out in the claims.

In the said drawings, A represents a vessel composed of two cylindrical cans of different diameters and heights placed one within the other to form a water-jacket between them, said cans being held together by a metal ring c at the top and tubular braces b below. The water-jacket is filled with water introduced through an opening d, Fig. 3, which is closed by a screw-cap e, Fig. 1. The vessel A, which is preferably supported on legs, is provided at its bottom with a faucet f, by means of which it may be emptied when necessary. Within the vessel A, the interior of which forms a cylindrical chamber B, is placed the calorimeter-can C, which receives the bomb or combustion-chamber D, within which the burning of the combustible is effected in an atmosphere of compressed oxygen gas, as hereinafter more fully described, the size of the calorimeter-can being such as to leave a suitable air-space around it.

E is a post which rises from the socket $g$, securely fastened by screws to the ring $c$, and serves to support an electric stirrer to be hereinafter described, which is adapted to be inserted within the water-jacket by passing it down through the opening $d$, Fig. 3, said stirrer serving to thoroughly mix the liquid in the water-jacket, thereby equalizing its temperature. This temperature may be measured by means of a thermometer introduced through an opening $h$, provided with a suitable stopper.

The exposed inner surface of the vessel A is nickel-plated and burnished, so as to reflect and not unduly absorb heat.

The cylindrical calorimeter-can C rests on a series of insulating cork-supports $i$, secured in position by a light frame $k$ of cruciform shape composed of vulcanite or other suitable insulating material, said frame being interposed between the bottom of the chamber B and that of the calorimeter-can C, as shown in Fig. 1. The calorimeter-can is made of light sheet metal and has its inner and outer surfaces nickel-plated and burnished, said can being provided with a removable but closely-fitting cover 25 of similar material.

$m$ $m$ are two knobs, Figs. 3 and 5, projecting laterally from the can C, to which may be hooked a bail for lifting said can out of the vessel A. The cover 25 is provided with an opening $n$, through which may be inserted a thermometer F for indicating the temperature of the fluid contained in the can C.

The shape of the calorimeter-can is that of an upright cylinder closed at the bottom and having a smaller auxiliary cylindrical chamber $p$, Fig. 5, on one side opening into the main chamber of the calorimeter-can and adapted to receive the tubular casing $q$ of the electric stirring device which may be lowered therein. This auxiliary chamber serves to greatly diminish the waste-space present in ordinary forms of calorimeter-cans, thereby lessening the amount of liquid necessary to completely cover the bomb or combustion-chamber and consequently increasing the accuracy of the thermometric measurements obtained. That greater accuracy may thereby be attained is evident, as the lessening of waste-space reduces in an advantageous manner the ultimate capacity of the vessel and makes it possible with a given amount of heat to raise a smaller amount of liquid through a greater range of temperature, thereby lessening the percentage of possible error in the thermometric readings.

The cover 25 of the calorimeter-can is an important feature of the present apparatus. Even the best measurements of the calorific power of fuels thus far obtained have been conducted in open calorimeter-cans, and losses of heat by radiation or of liquid by evaporation, varying in degree with the circumstances under which the measurements are taken, have not only been possible, but also probable. The cover which I have provided in no way interferes with the convenient carrying out of the determination and serves as an effective protection against all losses of this nature, however small.

The calorific power of any combustible being the heat evolved during its perfect and complete combustion can conveniently be determined by burning a known weight of the substance in such manner as to apply the total heat set free by the combustion to raising the temperature of a body of liquid of known temperature and weight through a greater or less number of degrees which are capable of accurate measurement. It being impossible to correctly measure the final temperature of the whole body of liquid after combustion unless this heat is evenly distributed throughout its mass it follows that a simple acting but thoroughly effective and reliable stirring device cannot be dispensed with. The varieties of stirrers employed for this purpose at the present time do not wholly meet the requirements, because they are either too bulky or too heavy, or because they do not stir the liquid perfectly. Some of these stirrers have several metallic rods projecting out of the calorimeter-can, which are liable to occasion small but variable losses of heat by conduction and radiation. Many of them are operated by hand, and this generally requires the undivided attention of a separate operator, while in some cases losses of liquid by spattering are possible and may destroy the accuracy of results otherwise satisfactory.

The form of stirrer which I employ is operated automatically by an electric motor G, firmly attached by screws to a bar 26, which may be swung directly over the auxiliary chamber $p$, Figs. 1, 4, and 5, of the calorimeter-can C when the latter is in position within the vessel A. This bar 26 is attached by screws 28 to two metal guides 29, which can be slipped at will up or down on the post E in such a manner that the motor and its supporting-bar may be firmly secured at any desired height by means of a binding-screw 30 on the upper guide 29. Below the horizontal lower portion 31 of the bar 26 and attached thereto by screws is a cylindrical block $r$, of non-conducting material, preferably vulcanite, the central portion 33 of which is of a reduced diameter, forming a neck, as shown in Figs. 1 and 10. Over the lower portion 34, Fig. 1, of the block $r$ is fitted the upper end of the removable tubular sheet-metal casing $q$ of the stirring device, secured in place by a bayonet-catch 35, Fig. 10, or other suitable fastening.

When the stirring device is lowered within the calorimeter-can in proper position for doing its work, the flanged top of the lower portion 34 of the vulcanite block $r$ is on a line introduced into the bomb or discharged therefrom. At the lower extremity of this passage is a small bent tube 53, made of gold or platinum or other non-corrodible metal or other metal suitably plated with either of the above-mentioned metals. This tube serves to deflect the currents of gas which are introduced into the bomb and prevents them from occasioning errors in the determination by scattering or blowing away portions of the charge placed beneath. At its upper extremity the passage 52 is enlarged to receive the stem of an automatic check-valve 54, to be hereinafter described, which loosely fits said passage.

At the foot of the neck 49 and encircling it a restricted portion of the surface of the lid 48 is made slightly convex, so as to form a narrow annular bearing 55. This bearing receives a projecting annular concave bearing 56, of smaller area, located on the under side of an overlying cylindrical closing-nut 57. This closing-nut 57, which screws into the neck of the bomb like a plug and by the aid of which the latter may be hermetically sealed, is comparatively light. It has a hexagonal head 58, which is grasped with a suitable wrench when it is desired to screw it down. Its outer edge is provided with a sufficient number of screw-threads to withstand shearing strains arising from the bursting forces developed within the bomb during the combustion. The neck 49 passes through a circular opening at the center of this nut of such diameter as to allow some play between the two parts, and all superfluous metal is removed from the central portion of the head of this nut at 59 partly to reduce its weight and also to permit the nut 51 to be screwed within the recess 59, thereby reducing to a minimum the height and weight of neck 49 and consequently also the total height and weight of the bomb with its closing device.

The area of bearing-surface provided between the closing-nut and the lid is less than the area of the bearing-surface between the lid and the soft-metal packing-ring as the latter is crushed down. It follows from these differences in the respective amounts of bearing or frictional surfaces and the fine grooving of the surfaces in contact with the soft-metal packing, together with the lubrication of the bearing-surfaces 55 56, that the closing-nut can be turned upon the lid without causing the latter to turn upon the soft-metal packing-ring, and consequently the direct downward pressure on the soft metal will cause it to adjust itself perfectly to any inequalities of the hard-metal surfaces in contact therewith and also be forced into all the crevices through which gas might escape. Furthermore, the closing-nut 57, which screws into the neck of the bomb like a plug and is of very moderate diameter and weight, entirely replaces the much heavier caps or covers hitherto used for the same purpose, the diameters of which are from one-third to three-fourths larger and are screwed down with invariably greater effort, friction, and wear upon the outside of instead of within the mouth of the neck of the bomb. By making the aperture in the closing-nut of somewhat larger diameter than the neck which passes therethrough a slight rocking motion of the lid as it is pressed down is permitted, which enables it to adjust itself to differences of resistance arising from variations in the thickness and hardness of different portions of the soft-metal packing, the width of the lower convex bearing-surface 55 being sufficient to permit said rocking motion.

The nut 51 has a longitudinal passage 60 opening into a chamber 61, formed within said nut, two valve-seats being provided, one at the top and the other at the bottom of said chamber. The upper part of this nut is furthermore threaded, so that during the submersion of the bomb the passage 60 can either be covered by a screw-cap 62, Fig. 1, bearing upon washers or connected by a pipe with a reservoir for supplying the bomb with oxygen or other gas.

The check-valve 54 rests on the lower seat of the chamber 61 while the bomb is being charged with gas, and consists of a thin disk of metal forming a head at the upper extremity of a short cylindrical guiding-stem, as shown in Fig. 9. The upper face of this disk is lightly grooved with concentric rings, so as to properly hold a washer of leather or other suitable material.

The head of the valve 54 is provided on its under side with one or more radial grooves 65, Fig. 9, extending from its periphery to the stem and communicating with longitudinal grooves 66 in the latter, the object being to permit the gases which are forced into the chamber 61 to pass under the valve as it rests upon its lower seat and thence by the vertical grooves in the stem into the bomb. As soon as the pressure which drives the gas into the bomb ceases the internal pressure from the interior of the latter forces the check-valve against its upper seat, hermetically sealing the passage 60 and consequently the bomb itself. Any trifling leakage of hot gases during an experiment arising from the use of an imperfect washer is unimportant, as it will either be stopped by the tight closing of the cap 62, or if it should escape from the latter it will bubble up through the liquid in the calorimeter-can at such a slow rate as to give up all its heat to said liquid and thereby introduce no error. With suitable care, however, in selecting the washers such leakage will not occur.

The notable reduction in the diameter of the opening into the bomb through its neck, made possible by the peculiar and simplified construction of the closing device, while in no way reducing the strength of the latter insures in every case the securing of a tight seal for the bomb.

The interior walls of the combustion-chamwith the upper edge of the calorimeter-can, as shown in Fig. 1.

The lateral portion 36, Fig. 6, of the cover 25, which fits over the auxiliary chamber *p*, is provided with a slot 37, which fits around the neck 33 and permits the removal of the cover, the slot being entirely closed by the underlying portion 34 of the vulcanite block *r*.

A light vertical shaft 38 is provided carrying one or more sets of propeller-blades 39, which can be set in motion within the tubular casing *q* by the electric motor G. The upper extremity of this shaft 38 is directly attached to the lower end of the motor-shaft by a connecting-nut 40, composed of vulcanite or other suitable insulating material, while its lower extremity runs in a suitable bearing at the center of a cross-bar 41, Fig. 1, extending across the open end of the tubular casing.

The propeller-blades 39 are so inclined that when the motor is set in motion the liquid in the lower part of the calorimeter-can will be sucked in through the open bottom of the tubular casing *q*, forced upward, and continuously discharged into the upper portion of the main chamber of the calorimeter-can through a suitable side aperture 42 near the top of said casing and opening at a point below the level of the liquid in the calorimeter-can. The ultimate result of the combined suction and propulsion of the liquid through this tubular casing, in connection with its discharge below the level of the main body of liquid in the calorimeter-can, is to bring about a quiet but very rapid circulation and mixture of the liquid around the bomb D without a particle of spattering or loss and an equally rapid equalization of temperatures throughout the mass of this liquid, the whole operation taking place under and without any removal of the cover of the calorimeter-can. The thermometric readings obtained under these very favorable conditions may therefore justly be expected to indicate with the greatest accuracy the exact temperature of the whole mass of liquid employed. The objection arising from the use of this form of stirrer, that it may influence, through mechanical friction, the temperature of the liquid which it stirs, need hardly be brought forward, for the reason that if any such influence exceeding that of other forms of stirrers now in use manifests itself the amount of that influence may be accurately measured and an exact correction applied, whereas with apparatus operated by hand and never twice at the same rate of speed the correct measurement of the magnitude of this correction cannot be determined with precision and can only be approximately learned. The stirrer furthermore serves a double purpose, for it may be either employed for mixing the liquid in the calorimeter-can or it can be raised, swung around through the arc shown by dotted lines in Fig. 3, and lowered through the aperture *d* into the water-jacket, so as to agitate at will the contents of the latter, as previously described.

The possible danger of trifling leakage of electric current or of heat from the calorimeter-can, leading to losses by conduction through the stirring apparatus or radiation therefrom, is avoided, first, by the employment of the non-conducting connecting-nut 40, and, second, by immersing nearly the whole of the tubular casing *q*, which is attached to the non-conducting block *r*, the lower portion 34 of which is kept below the cover 25 of the calorimeter-can during the test.

The only metal conductor leading out of the calorimeter-can through which a trifling amount of heat might be lost by conduction or radiation is the small stirrer-shaft 38, less than an inch of which above the block *r* is uncovered and exposed to the air. To avoid this practically negligible source of error, any exposed portion of this shaft projecting out of the calorimeter-can may, if desired, be made of vulcanite or other non-conductor of heat.

The combustion of the substance whose calorific power is to be determined is conducted in the tightly-closed bomb or combustion-chamber D, made of bronze or other suitable metal. Preference is given to aluminium-bronze as a material, as this alloy can be made to yield very sound castings and not only possesses the requisite strength and toughness, but also may be easily worked, is a rapid transmitter of heat, can be readily and very satisfactorily electroplated, and admits of being handsomely finished. The walls of the bomb are made of such thickness as to safely withstand the rupturing strains to which it is exposed during the experiments. The shape of the bomb is that of a hollow sphere with a short cylindrical neck *s* above, provided with thickened walls, by which access to the interior through a circular opening 45 is obtained, this shape combining at the same time greatest capacity and strength with least weight of metal. The upper portion of said opening is provided with a screw-thread, while its lower portion is of reduced diameter, forming a shoulder 46, adapted to receive a packing-ring or washer 47, of soft metal, preferably lead, upon which the lid 48, which serves to cover the opening 45, is placed. The under surface of this lid is of concave form, as shown, and said lid has a flange *t*, the lower surface of which is provided with fine concentric grooves, Fig. 8. The shoulder 46 is similarly grooved, the result being that when pressure is brought to bear vertically down upon the lid, so as to crush the washer 47, these concentric grooves will receive the soft metal and aid in securing a tight joint. Rising from the center of the upper surface of the lid 48, of which it forms a part, is a short neck 49, having at its upper extremity a threaded portion 50, of smaller diameter, on which a nut 51 may be screwed. This neck 49 has a central longitudinal passage 52, of small diameter, through which gases may be ber and the exposed portions of the lid are protected against the corrosive action of such acids or gases as may remain within the bomb after combustion by being heavily coated with an electrodeposited lining of gold or other non-corrodible metal. This lining is burnished and resists corrosion perfectly, and it is sufficiently durable. It is also an excellent conductor of heat and may be readily renewed at comparatively small cost. It takes the place of the enormously expensive linings of sheet gold or platinum, hitherto used, as well as that of the untrustworthy enamel linings, similarly used, which soon crack, do not long protect the metal of the bomb from corrosion, are poor conductors of heat, and are the cause of serious errors in the measurements.

The spherical form of the bomb, as described, affords the greatest capacity and strength for a given weight of metal, while the total mass of metal in the bomb is also reduced by the peculiar construction of the closing device, this reduction in weight of metal diminishing the absorption of heat by its mass. The percentage of error in the thermometric readings is made less by this diminution in weight for the reason that the smaller mass of liquid required for completely submerging the bomb is raised by the combustion through a greater range of temperature.

The crucible-stand, the joints of which are welded so as to withstand high temperatures without injury, serves to hold the platinum crucible 69, within which the combustible is placed. This stand consists of a ring 68, Figs. 1 and 7, having lateral projections 70, extending inward therefrom, against which the crucible rests, said stand being provided with legs in electric contact with the floor of the combustion-chamber. One of these legs is prolonged above the ring to form a post 71, while on the opposite side a lateral arm 72, Figs. 1 and 11, carries a removable insulating-block 73, made of lava, pipe-clay, or other suitable heat-resisting and non-corrodible material. Around this block, which is provided with a peripheral groove, is clasped the lower end of a conducting-rod 74, Fig. 12, bent to fit this groove and tightened by a ring 75, sliding over the free end of the rod, as shown in Figs. 1, 11, and 12. The arrangement is such that in case of injury to the block 73 a new block may quickly be sprung into place and tightly secured by means of the ring 75. When the block 73 is slipped upon the arm 72, the rod 74 serves as a handle whereby the whole stand may be lifted in and out of the bomb.

The rod 74 is bent toward the post 71 to bring it near the same, said rod and post serving as points of attachment for the ends of a short loop 76, of platinum wire, attached thereto in any suitable manner. This loop, which serves to ignite the combustible, may be carried under the surface of the latter, so as to be in contact therewith, as shown in Fig. 1. The removal of the stand from the bomb facilitates the correct adjustment of the igniting-wire, after which the stand may be lowered into the bomb so as to rest upon its floor, the upper looped end of the conducting-rod 74 being slipped through an eye 78, Fig. 1, at the end of an arm 79, made of non-corrodible metal. This arm extends from a head 80, Fig. 8, suitably protected against corrosion and forming part of the electric igniting-circuit.

The head 80 is suitably insulated by a washer 81 from contact with a sleeve 82, which encircles it, and carries a connecting-rod 83, which passes through this sleeve and is properly insulated therefrom by a packing 84 of non-conducting material.

The sleeve 82 facilitates the attachment of the device to the bomb and the proper insulation of the parts. The aperture in the bomb to which the sleeve 82 is closely fitted is made gas-tight by means of soft-metal washers 85 and 86, the sleeve being tightly secured in the proper position by means of a nut 87, which is screwed upon its outer end. A knob or head 88 is then screwed upon the end of the connecting-rod 83, a washer 89, of insulating material, being interposed between the knob and the nut 87. When the bomb is placed within the calorimeter-can C in the proper position for conducting a combustion, it rests upon a metal support H, of cruciform shape, placed on the floor of the can. This support is so notched or cut away at points 90 as to offer no impediment to the free circulation of liquid under the bomb.

The knob 88 is in electric connection with an automatic spring-contact 91, Fig. 1, insulated from the calorimeter-can by a block of vulcanite 92, or other suitable insulator, attached by means of screws to its interior wall. A short metal bolt 93 connects it with an insulated binding-post 94, Figs. 1 and 5, situated on the outside of the calorimeter-can, and to which is attached a circuit-wire 95, another wire 96 being secured to any other part of the calorimeter-can to complete the circuit. An electric igniting-current may then be passed through the loop 76 within the bomb by closing the circuit with a key or press-button 98, Fig. 3, the loop being rendered white hot by the resistance which it offers to the passage of the current and igniting the combustible in contact therewith. The advantages of this method of ignition are that the operation is simplified, requiring only the pressing of a key, while the ignition of the combustible takes place without removing the cover of the calorimeter-can. Moreover, the use of a key makes it possible to definitely measure the period of time during which the current is passing, thereby enabling the operator to ascertain the exact amount of heat introduced by the electric current and to apply to the results a proper correction therefor.

When combustion has taken place, the acid vapors formed condense for the most part in the interior of the bomb, and after washing out and determining the amount of acids present a suitable correction is applied to the results. In order to effect and control the discharge of these vapors in such manner as to make it possible to determine the amount of acids which might be present in the uncondensed vapors and also to enable samples of the gases to be taken for analysis in order to prove or disprove the completeness of the combustion, I employ a discharging device consisting of a nut K, Fig. 8, adapted to be screwed upon the nut 51 after the cap 62 has been removed therefrom.

The nut K is provided with a chamber 100, communicating with a nozzle 101, upon which may be slipped a flexible tube 102 for conducting the gas to any desired point. Above the chamber 100 and communicating therewith through an aperture 103 is a stuffing-box 104, through which passes a spindle 105, attached to a thumb-screw 106, turning within the gland 107, the latter fitting a screw-thread within the stuffing-box. When the nut K is screwed onto the nut 51, the spindle 105 extends through the aperture 60 of the latter into such a position that it nearly touches the check-valve 54, so that by slightly turning the thumb-screw 106 the spindle may be depressed to force the head of the valve 54 away from its upper seat, when the gas will escape through the passage 60 into the chamber 100 and thence out through the nozzle 101.

The calorific power of gases is determined in the apparatus above described by introducing into the bomb a measured volume of the gas and immediately afterward the proper charge of oxygen to effect its combustion. With gases no crucible is required, as the ignition may be brought about by simply passing the electric current through the igniting-wire.

The apparatus may also do service in a multitude of scientific researches which require very accurate determinations of the calorific power, extremely accurate results being readily obtained therewith.

Briefly described, the operation of my improved calorimeter is as follows: A weighed portion of combustible being placed in the crucible 69, supported upon the crucible-stand, the igniting-wire 76 is adjusted and its loop depressed below the surface of the combustible. The stand is then lowered into the bomb until it rests upon its floor, the upper extremity of the rod 74 being slipped through the eye 78 of the arm 79. The neck s of the bomb is then secured in a clamp provided for the purpose, the soft-metal packing-ring 47 is placed upon the shoulder 46, the lid 48 dropped into place, its top lubricated, if necessary, and the closing-nut 57 screwed firmly home. The check-valve 54 is then inserted, the nut 51 screwed over it, and its top connected by means of a suitable nut and tube with an oxygen-reservoir from which the bomb receives its proper charge of gas. After being disconnected from the gas-supply the cap 62 is put on, and the bomb is then lowered into the calorimeter-can, care being taken to bring the insulated knob 88 in electric connection with the automatic spring-contact 91. The stirring apparatus is then lowered into position and the calorimeter-can filled with a measured amount of liquid sufficient to entirely cover the bomb. The cover of the calorimeter-can is then put on, the thermometer adjusted, and all necessary electric connections made. The electric stirrer is set in motion, preliminary readings of the temperature of the liquid are taken, and when the temperatures have reached a condition of equilibrium the charge is ignited by closing the electric igniting-circuit, and observations of the rising temperature are noted until the maximum is reached. Other readings are then taken to ascertain the rate of cooling off during the experiment, and the calorific power of the combustible is then deduced with very great accuracy from the measured increase of temperature, after certain necessary and well-known corrections have been applied.

What I claim as my invention, and desire to secure by Letters Patent, is—

1. In a calorimeter, a calorimeter-can for containing a bomb or combustion-chamber, said can having on one side an auxiliary chamber open to its main portion or chamber, in combination with a stirrer or agitating device placed within said auxiliary chamber and arranged to produce a free circulation of the fluid within the main chamber to equalize the temperature of said fluid throughout its mass, substantially as described.

2. In a calorimeter, a calorimeter-can for containing the bomb or combustion-chamber, said can being provided with a removable cover, and having on one side an auxiliary chamber open to its main portion or chamber, in combination with a stirrer or agitating device placed within said auxiliary chamber and arranged to produce a free circulation of the fluid within the calorimeter-can to equalize the temperature of said fluid throughout its mass, substantially as described.

3. In a calorimeter, a calorimeter-can provided with a cover and having on one side an auxiliary chamber open to its main portion or chamber, in combination with a tubular casing fitting within said auxiliary chamber and communicating therewith at the top and bottom, said casing having mounted therein a central shaft carrying a stirrer or agitating device arranged to force the fluid through the tubular casing and discharge the same into the main chamber, and means for rotating said shaft, whereby a complete circulation of the fluid in the calorimeter-can is effected, said tubular casing with its shaft and agitator being made movable vertically on a suitable support, substantially as and for the purpose set forth.

4. A calorimeter comprising a vessel provided with a water-jacket having an opening at its top, a removable calorimeter-can of smaller diameter placed within said vessel and separated therefrom at the bottom by means of a rest of insulating or non-conducting material, a bomb or combustion-chamber placed within the calorimeter-can, the latter being provided with a cover and having on one side an auxiliary chamber open to its main portion or chamber, a tubular casing fitting within said auxiliary chamber and communicating therewith at the top and bottom and carrying a central shaft provided with a stirrer or agitating device arranged to produce a circulation of the fluid within the main chamber, and means for rotating said shaft, said tubular casing with its agitating mechanism being adjustably mounted on a vertical supporting-rod, whereby it may be raised or lowered and swung in the arc of a circle to enable it to be inserted within said auxiliary chamber or passed down through the opening in the top of the water-jacket to produce a circulation of the fluid in the latter or in the calorimeter-can, means for insulating the agitating device from the calorimeter-can whereby leakage of electric current or loss of heat by conduction is prevented, an electric circuit provided with an igniting-wire for kindling the combustible to be tested, and one or more thermometers in contact with the fluid, substantially as set forth.

5. In a calorimeter, a bomb or combustion-chamber for containing the combustible to be tested, said bomb having a threaded opening at its top provided with a shoulder, a soft-metal packing-ring on said shoulder, a lid resting on said soft-metal ring and provided with a central neck having a valved passage for the introduction of gas to the interior of the bomb or its discharge therefrom, and a closing-nut turning within the threaded opening of the bomb and encircling the neck of the lid and bearing on the surface of said lid at the foot of the neck, the area of the friction or bearing surface of the closing-nut in contact with the lid being less than that of the surface of the lid in contact with the soft-metal packing, whereby the nut can be rotated, without turning the lid upon the soft-metal packing-ring, substantially as described.

6. In a calorimeter, a bomb or combustion-chamber for containing the combustible to be tested, said bomb having a threaded opening at its top provided with a shoulder, a soft-metal packing-ring on said shoulder, a lid resting on said soft-metal ring and provided with a central neck having a valved passage for the introduction of gas to the interior of the bomb or its discharge therefrom, and a closing-nut turning within the threaded opening of the bomb and encircling the neck of the lid and bearing on the surface of said lid at the foot of the neck, the contacting bearing-surfaces of the closing-nut and lid being, the one concave and the other convex, and the area of the friction or bearing surface of the closing-nut in contact with the lid being less than that of the surface of the lid in contact with the soft-metal packing, whereby the nut can be rotated without turning the lid upon the soft-metal packing-ring, substantially as and for the purpose set forth.

7. In a calorimeter, a calorimeter-can for containing the bomb or combustion-chamber, said calorimeter-can being provided on its interior surface with an insulated spring-contact connected with an electric circuit, in combination with the bomb or combustion-chamber having an outer insulated projection adapted to rest against said spring-contact when the bomb is placed within the calorimeter-can, said projection being electrically connected with the stand or device within the bomb for holding the combustible to be tested and igniting the same, said stand forming a portion of the electric circuit, substantially as described.

8. In a calorimeter, the combination with the bomb or combustion-chamber of a removable crucible-holding stand resting upon and in electrical connection with its floor or bottom and having a series of pointed rests for the crucible, and an electric igniting-wire passing into the latter, said stand having an upright portion insulated at its point of attachment to the base of said stand, and adapted when placed within the bomb to engage an insulated arm forming part of the electric circuit, and projecting from the interior of said bomb, substantially as set forth.

9. In a calorimeter, the combination with the calorimeter-can having an auxiliary chamber on one side of the same and provided with a removable cover having a slotted projection fitting over said auxiliary chamber, of a tubular casing fitting within said auxiliary chamber and carrying a stirrer or agitating device, and provided with a block of insulating material located directly under said slotted projection to close the slot in the same, and fitting the top of the tubular casing, substantially as set forth.

10. In a calorimeter, a calorimeter-can provided with a removable cover and having on one side an auxiliary chamber open to its main portion or chamber, in combination with a stirrer or agitator composed of a vertical rotary shaft provided with an agitator and inclosed within a tubular casing adapted to be inserted within and withdrawn from said auxiliary chamber, said tubular casing being open at the bottom and provided near its top on the side facing the main chamber of the calorimeter-can with a discharge-outlet located beneath the level of the water in said can, substantially as described.

11. In a calorimeter, the combination with the calorimeter-can provided on one side with an auxiliary chamber opening into its main portion or chamber, a stirring device located within said auxiliary chamber, a bomb or combustion-chamber located within the calorimeter-can, and a rest interposed between the bomb and the bottom of the can, said rest being provided with notches to permit the fluid when set in motion by the stirrer to circulate freely around the bottom of the bomb, substantially as described.

12. In a calorimeter, the combination with the bomb, its lid provided with a central neck having a vertical passage, the nut 51, chamber 61, and the check-valve 54, of the gas-discharging device, comprising a tubular casing having a discharge-nozzle and a spindle with an operating thumb-screw for forcing it down upon the check-valve to open the same and allow the gas to escape into the tubular casing and out through the nozzle of the same, substantially as described.

Witness my hand this 3d day of December, A. D. 1896.

HENRY J. WILLIAMS.

In presence of—
P. E. TESCHEMACHER,
B. L. MARDEN.